United States Patent
Crandall et al.

(10) Patent No.: US 8,891,894 B2
(45) Date of Patent: Nov. 18, 2014

(54) PSYCHOVISUAL IMAGE COMPRESSION

(75) Inventors: Richard E. Crandall, Portland, OR (US); Rudolph van der Merwe, Portland, OR (US); Douglas P. Mitchell, Lake Forest Park, WA (US); Ian Hendry, Santa Clara, CA (US); Bertrand Serlet, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 314 days.

(21) Appl. No.: 13/250,893

(22) Filed: Sep. 30, 2011

(65) Prior Publication Data
US 2013/0084003 A1    Apr. 4, 2013

(51) Int. Cl.
| | | |
|---|---|---|
| G06K 9/36 | (2006.01) | |
| H04N 7/12 | (2006.01) | |
| H04N 19/103 | (2014.01) | |
| H04N 19/137 | (2014.01) | |
| H04N 19/186 | (2014.01) | |
| H04N 19/50 | (2014.01) | |
| H04N 19/593 | (2014.01) | |
| H04N 19/182 | (2014.01) | |
| H04N 19/154 | (2014.01) | |

(52) U.S. Cl.
CPC ... H04N 19/00145 (2013.01); H04N 19/00018 (2013.01); H04N 19/00315 (2013.01); H04N 19/00763 (2013.01); H04N 19/00569 (2013.01); H04N 19/00303 (2013.01); H04N 19/002 (2013.01)
USPC ........................ 382/239; 382/166; 375/240.1

(58) Field of Classification Search
None
See application file for complete search history.

(56) References Cited

U.S. PATENT DOCUMENTS

| | | | | |
|---|---|---|---|---|
| 5,247,589 | A * | 9/1993 | Faul et al. | 382/166 |
| 5,438,635 | A * | 8/1995 | Richards | 382/232 |
| 5,506,604 | A * | 4/1996 | Nally et al. | 345/603 |
| 5,774,577 | A * | 6/1998 | Ueda et al. | 382/162 |
| 6,044,172 | A * | 3/2000 | Allen | 382/166 |
| 6,122,442 | A * | 9/2000 | Purcell et al. | 345/620 |
| 6,256,350 | B1 * | 7/2001 | Bishay et al. | 375/240.21 |
| 6,384,838 | B1 * | 5/2002 | Hannah | 345/601 |
| 6,388,674 | B1 * | 5/2002 | Ito et al. | 345/590 |
| 6,427,025 | B1 * | 7/2002 | Shimomura et al. | 382/232 |
| 6,608,935 | B2 * | 8/2003 | Nagumo et al. | 382/233 |
| 6,697,520 | B1 * | 2/2004 | Hemingway | 382/166 |

(Continued)

FOREIGN PATENT DOCUMENTS

| | | |
|---|---|---|
| EP | 1317145 A1 | 6/2003 |
| KR | 100296921 B1 | 7/2001 |

OTHER PUBLICATIONS

Benk, Stefan, "Psycho-Visual Model of the Human Optical System as Base for Lossy-Lossless Compression of Visual Information," TELSIKS 2001. 5th International Conference on Telecommunications in Modern Satellite; Cable and Broadcasting Service; vol. 2; Sep. 19-21, 2001; pp. 430-433; DOI: 10.1109/TELSKS.2001.955813.

*Primary Examiner* — Wenpeng Chen
(74) *Attorney, Agent, or Firm* — Fish & Richardson P.C.

(57) ABSTRACT

Psychovisual image compression techniques are disclosed that compress pixel data by a fixed compression ratio with little or no perceptual loss of detail. In some implementations, a psychovisual compression process is selected among several psychovisual compression processes based on characteristics of the pixel data. Compression is achieved during encoding by discarding psychovisually unnecessary bits from the pixel data. The psychovisual compression processes can be implemented in hardware and operate on scan lines of pixels captured by the image sensor. The psychovisual compression techniques can be used with image compression techniques to compress further the pixel data.

14 Claims, 17 Drawing Sheets

(56) References Cited

U.S. PATENT DOCUMENTS

| | | | |
|---|---|---|---|
| 6,778,181 B1* | 8/2004 | Kilgariff et al. | 345/582 |
| 6,865,291 B1* | 3/2005 | Zador | 382/166 |
| 7,142,251 B2* | 11/2006 | Sha et al. | 348/557 |
| 7,680,346 B2 | 3/2010 | Han | |
| 7,693,326 B1 | 4/2010 | Luo | 382/162 |
| 7,764,834 B2* | 7/2010 | Simard et al. | 382/166 |
| 8,055,069 B2* | 11/2011 | Chiang et al. | 382/166 |
| 8,345,753 B2* | 1/2013 | Lee et al. | 375/240.1 |
| 8,385,639 B2* | 2/2013 | Fukuma | 382/166 |
| 8,428,128 B2* | 4/2013 | Park et al. | 375/240.12 |
| 2002/0039440 A1* | 4/2002 | Sakuyama | 382/166 |
| 2002/0164073 A1* | 11/2002 | Lei et al. | 382/166 |
| 2003/0002734 A1* | 1/2003 | Islam et al. | 382/166 |
| 2003/0201994 A1* | 10/2003 | Taylor et al. | 345/581 |
| 2003/0223633 A1* | 12/2003 | Pohjola | 382/166 |
| 2005/0129130 A1* | 6/2005 | Shen et al. | 375/240.24 |
| 2005/0206784 A1* | 9/2005 | Li et al. | 348/441 |
| 2006/0126951 A1* | 6/2006 | Lee et al. | 382/232 |
| 2006/0215907 A1* | 9/2006 | Shefer | 382/166 |
| 2007/0091115 A1* | 4/2007 | Takada et al. | 345/603 |
| 2007/0206874 A1* | 9/2007 | Lee et al. | 382/239 |
| 2008/0131087 A1* | 6/2008 | Lee et al. | 386/112 |
| 2008/0317116 A1* | 12/2008 | Lee et al. | 375/240.01 |
| 2009/0147845 A1* | 6/2009 | Matsumura et al. | 375/240.03 |
| 2009/0245631 A1* | 10/2009 | Isomura | 382/166 |
| 2010/0142812 A1* | 6/2010 | Chen | 382/166 |
| 2010/0182402 A1* | 7/2010 | Nakajima et al. | 348/42 |
| 2011/0002551 A1* | 1/2011 | Fukuma | 382/232 |
| 2011/0007979 A1* | 1/2011 | Goma | 382/239 |
| 2011/0096839 A1* | 4/2011 | Gomila et al. | 375/240.16 |
| 2011/0116549 A1* | 5/2011 | Sun | 375/240.16 |
| 2012/0189199 A1* | 7/2012 | Berent | 382/166 |
| 2012/0213435 A1* | 8/2012 | Donovan et al. | 382/166 |

* cited by examiner

US 8,891,894 B2

PSYCHOVISUAL IMAGE COMPRESSION

TECHNICAL FIELD

The disclosure generally relates to image compression.

BACKGROUND

Visual perception rules are often utilized in the image compression field to improve compression techniques and methods. For example, conventional image compression methods may use chroma averaging over pixel pairs or quads because luminance is more important than chroma to the perception of an image at high resolution. One goal to be achieved by these compression techniques is to compress images without a perceptual loss of detail.

SUMMARY

Psychovisual image compression techniques are disclosed that compress pixel data by a fixed compression ratio with little or no perceptual loss of detail. In some implementations, a psychovisual compression process is selected among several psychovisual compression processes based on characteristics of the pixel data. Compression is achieved during encoding by discarding psychovisually unnecessary bits from the pixel data. The psychovisual compression processes can be implemented in hardware and operate on scan lines of pixels captured by the image sensor. The psychovisual compression techniques can be used with image compression techniques to compress further the pixel data.

In some implementations, a method can include: obtaining pixel data having a first data size; determining a processing mode from a number of available processing modes based on characteristics of the pixel data; selecting a psychovisual compression process based on the determined processing mode; and psychovisually compressing the pixel data to a second data size using the selected psychovisual compression process, where the second data size is less than the first data size and the first data size and the second data size have a fixed ratio.

In some implementations, an image processing apparatus can include an image sensor configured to capture image data and one or more processors coupled to the image sensor. The processor(s) can be configured to: determine a processing mode from a number of available processing modes based on characteristics of the pixel data; select a psychovisual compression process based on the determined processing mode; and psychovisually compress the pixel data to a second data size using the selected psychovisual compression process, where the second data size is less than the first data size and the first data size and the second data size have a fixed ratio.

Particular implementations provide at least the following advantages: 1) pixel data (e.g., display-screen images) are compressed to a fixed compression ratio with little or no perceptual loss of detail; 2) bandwidth is reduced and fixed on data channels that transfer the compressed pixel data; 3) the compression processes can be performed in hardware on scan lines of pixels captured by an image sensor; and 4) psychovisually compressed pixel data can be further compressed by other image compression processes.

Details of one or more implementations are set forth in the accompanying drawings and the description below. Other features, aspects, and potential advantages will be apparent from the description and drawings, and from the claims.

DETAILED DESCRIPTION

Psychovisual Phenomena

Figure 1A:
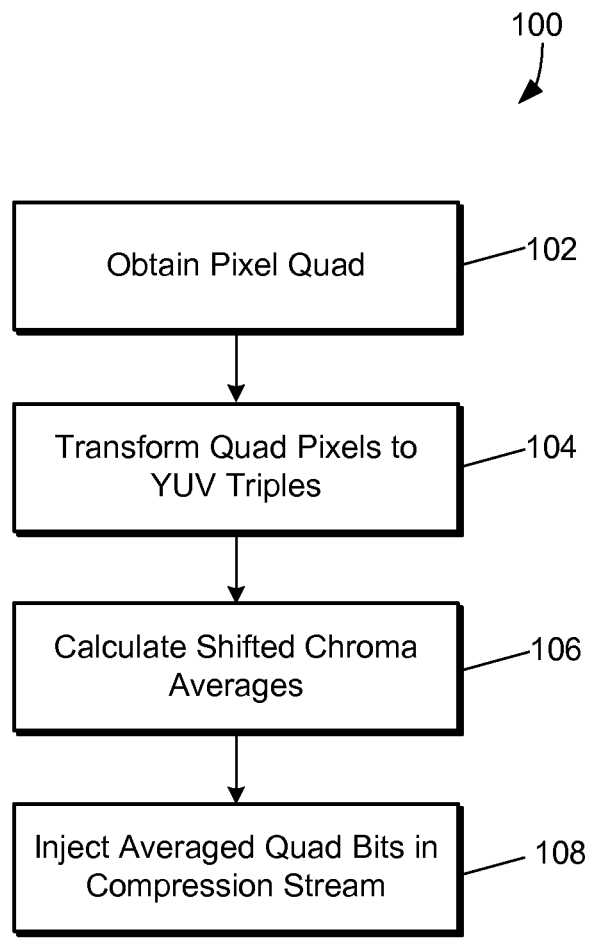
FIG. 1A is a flow diagram of an example process for fast chroma averaging.

Visual perception rules are used in the compression field to compress images while minimizing the amount of visual data lost in the compression process. One visual perception rule is that luminance is more important than chroma at high resolution. Thus, compression processes often use chroma averaging over pixel pairs or quads.

Other psychovisual phenomena or visual perception rules can be employed to compress images while reducing the amount of data lost or while reducing the distortion of an image. These phenomena include but are not limited to:

Luminance (y-channel) is more important than chroma because y averaging is rarely allowed if image integrity is to be preserved. In certain local scenarios, however, chroma (u-channel, v-channel) data can be locally averaged or smoothed.

In localities of radically fluctuating chroma, bits of y, u, v, can be reduced while still allowing proper perceptual color changes.

For some images, such as screen displays, the fidelity of "horizontal bar" mode (a quad is two horizontal pairs of in-pair common colors) and the "vertical bars" mode (a quad is two vertical pairs of in-pair common colors) should be preserved. An example is anti-aliased font, where a dark letter stroke is next to a light (but colored) anti-aliased stroke.

Gray scale images should be lossless or nearly lossless due to the importance of the luminance channel.

It is found experimentally that over a wide class of test images, chroma channels tend to be narrowly distributed near zero (e.g., according to Laplacian distribution). This is also true of desktops, menus (e.g., modern screen displays) and photographic (e.g., digital camera) images. This means that certain forms of chroma quantization can be advantageous.

Lossless YUV Transform

There are many ways to transform a color triple (e.g., Red, Green, Blue or RGB) into luminance and two chroma channels. The transformed luminance/chroma triple can be denoted by a YUV color model. For digital encoding of color information, YCbCr is a common color model. A particularly useful YUV transform is $$y = \left\lfloor \frac{2r + 2g + 2b + 3}{6} \right\rfloor, \quad (1)$$

$$u = \left\lfloor \frac{r - 2g + b}{2} \right\rfloor,$$

$$v = r - b.$$

One special property of this forward transform is mutual normality, in that (if floor operations are removed), formally, $y \cdot u = u \cdot v = y \cdot v = 0$. The exact inverse of $$r = y + \left\lfloor \frac{2u + 3v + 3}{6} \right\rfloor, \quad (2)$$

$$g = y - \left\lfloor \frac{4u + 3}{6} \right\rfloor,$$

$$b = y + \left\lfloor \frac{2u - 3v + 3}{6} \right\rfloor,$$

then applying the condition if ($u$ mod 3==2 and ($r+g+b$)mod 3==0)--$g$.

Although transform (1) and inverse transform (2) (with the condition performed) is a lossless operation, it may be practical to present an illegal triple to the inverse transform (2) because quantization has perturbed the luminance or chroma. In such a case, an "inverse-clip" transform can be used with the inverse transform (2) together with a final clipping to restrict the (r, g, b) result to the standard 24-bit RGB color cube which can be mathematically represented as $$(r,g,b) \rightarrow (r',g',b') \in [0,255]^3, \quad (3)$$

where clipping can be performed by forcing each color component, c, to the assignment c':=max (0, min (c, 255)).

Other YUV transforms exist, some of which are faster or less noisy than the YUV transform (1). These other YUV transforms can also be used in the compression processes described as below.

Fast Chroma Averaging

FIG. 1A is a flow diagram of an example process 100 for fast chroma averaging. For example, when performing fast chroma averaging, 96-bit rgb pixel quads are assumed and chroma averaging is used to establish an invariant 2:1 compression ratio. At step 102, a pixel quad can be obtained. For example, the pixel quad can be obtained directly from image sensor hardware or an image stored on a storage device, such as memory, local persistent storage (e.g., local hard drive) or a network storage device.

At step 104, YUV transform (1), above, can be used to establish four triples $y_i$, $u_i$, $v_i$, for each pixel in a quad. For example, the r, g, b, values for each of the four pixels in the pixel quad can be transformed to y, u, v, values.

At step 106, shifted chroma averages can be calculated based on $y_i$, $u_i$, $v_i$ triples according to $$U := \left\lfloor \frac{\left\lfloor \frac{\sum_i u_i + 2}{4} \right\rfloor}{2} \right\rfloor, \quad (4)$$

$$V := \left\lfloor \frac{\left\lfloor \frac{\sum_i v_i + 2}{4} \right\rfloor}{2} \right\rfloor, \quad (5)$$

where U and V each have a dynamic range of 8 bits.

At step 108, 48 stream bits can be injected into the compression stream for each quad based on the U, V averages calculated for each pixel in the quad. For example, the luminance (y values) for each pixel in the quad can be encoded in the compression stream (e.g., four y values) while only a single averaged value for U and V can be encoded in the compression stream for each quad. Since a lossless transform is used to calculate U and V, and a single averaged value for U and V is encoded in the compression stream together with four luminance values, a fixed 2:1 compression results. When the compression stream is decoded by a decoding device, the resulting decoded image will have no perceptual loss of detail since the luminance values for the four pixels is included in the encoding and luminance is more important than chroma to preserve image integrity.

Figure 1B:
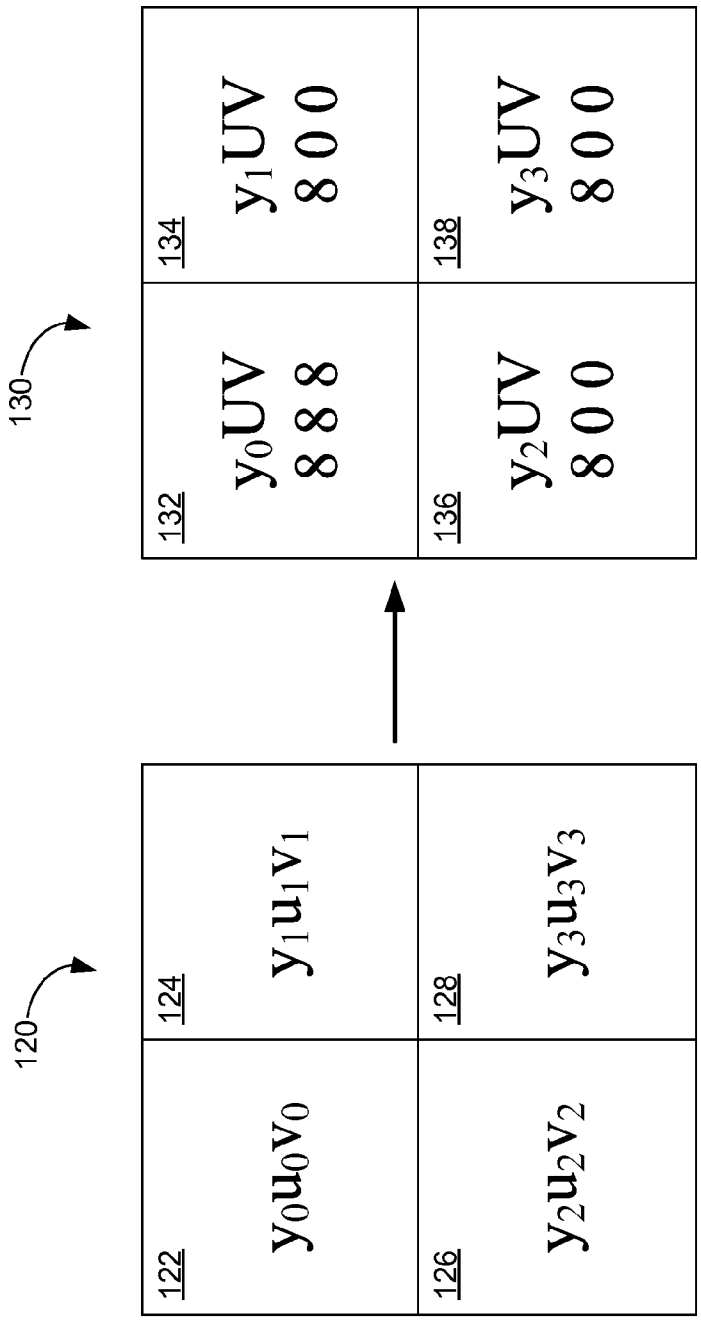
FIG. 1B illustrates an example of chroma averaging over a pixel quad.

FIG. 1B illustrates an example of chroma averaging over a pixel quad. In some implementations, chroma averaging can yield a 2:1 compression ratio. For example, the luminances $y_i$ can be losslessly preserved for any quad using the encoding described in reference to FIG. 1A. Referring to FIG. 1B, quad 120 can include pixels 122, 124, 126 and 128 which can be encoded with 96 bits (e.g., 8 bits/data×12 pixel data). Using the chroma averaging process above, quad 120 can be compressed to quad 130 including compressed pixel data 132, 134, 136 and 138, which was encoded with 48 bits (e.g., 8 bits/data×6 pixel data). Although the luminance values for each pixel is encoded in the compression stream, only the average chroma values (e.g., U, V) across the quad are encoded into the compression stream. For a given quad, the inverse-clip transform (3) can be performed on each $y_i$UV value to recover 96 bits of rgb pixel data.

Simplex Compression

In some implementations, a Simplex compression process can perform conditional chroma averaging. Simplex compression performs chroma averaging only on the 12-dimensional points representing a quad (in luminance-chroma coordinates) that lie in a certain simplex, which is essentially a polyhedron in 12-space. If the point lies outside the simplex, it is not chroma averaged. To perform conditional chroma averaging, a psychovisual compressor can be configured to switch between four processing modes depending on characteristics of the pixel data, such as the chroma content. Simplex compression results in a decimation of the 12-dimensional space (decimation of four yuv triples) into appropriate simplices (essentially a polyhedral).

A smooth image that is losslessly compressed will provide a correspondingly large compression ratio and a noisy image that is losslessly compressed might have a compression ratio of about 1 due to entropy. A reasonable error (e.g., RMSE) is zero for lossless compression results. Simplex compression flattens the compression ratio versus entropy curve for an invariant 2:1 ratio. Simplex compression also allows the RMSE to build up for "noisy" images, which, in effect, provides extra fidelity to more compressible images. The psychovisual phenomena previously described above are exploited by Simplex compression so that higher RMSE is invisible to the human eye.

The following functions can be used to perform Simplex compression. For example, if a y value is to be sent to the compression stream as a b-bit number, a function Y (y, b) can be implemented that lies in the range $[0, 2^b-1]$. Upon decode, a function y(Y, b) can be implemented that attempts to reverse the b-bit quantization. For example, the functions Y, y cannot be exact inverses unless b=8. Functions U(u, b), V(v, b), u(U, b) and v(V, b) can be implemented similarly to Y(y, b) and y(Y, b).

One aspect of high-quality quantization is that, unlike the scenario in rgb space, the cross-section of the RGB color cube has become, in yuv space, a polyhedron that is not a cube. For example, functions cmaxU(y), cminU(y), cmaxV(y) and cminV(y) representing a bounding rectangle for the uv cross-section at given y can be used to design suitable encoding functions. Knowing these extremal values enhances quantization efficiency. In particular, the uv cross-section can be tightly constrained near black, white (y~0, 255, respectively) corners of the yuv polyhedron. In some implementations, the cmin/cmax functions can be achieved through fixed table-lookup. Under the yuv transformation, however, lookups can be avoided by using algebra due to the regularity of the y-dependent external values.

Examples of quantization/dequantization functions used are exhibited in the example pseudo code below, as encY[ ], decY[ ] for y-channels, decH[ ] for direct r, g, b decoding, and encC[ ], decC[ ] for properly constrained chroma dequantization. The appropriate constraints are shown in the code as table lookups, indexed by $y \in [0; 255]$.

Figure 2A:
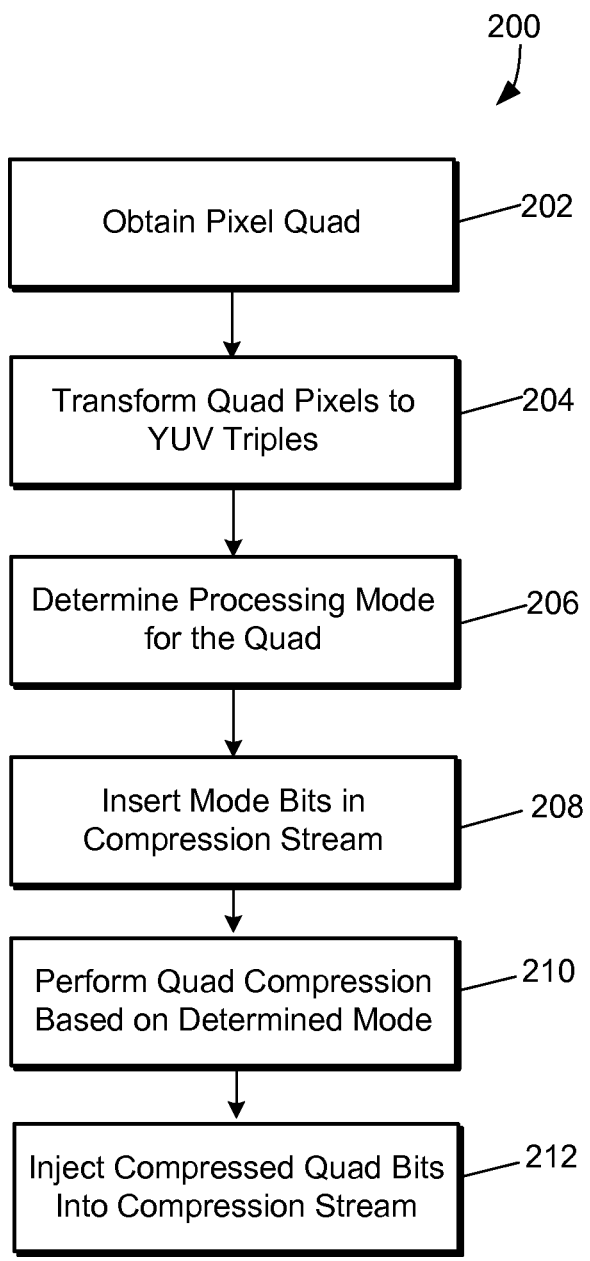
FIG. 2A is a flow diagram of an example process for performing Simplex image compression.

FIG. 2A is a flow diagram of an example process 200 for performing Simplex compression. For the example Simplex compression process 200, 96-bit rgb pixel quads are assumed, and simplectic bounds are used on each quad to establish an invariant 2:1 compression ratio. Other simplectic bounds can be used to establish other invariant compression ratios.

At step 202, a pixel quad can be obtained. The pixel quad can be obtained from image sensor hardware or a storage device (e.g., memory, hard drive, network storage). For example, the pixel quad can be obtained from an image capture device, such as a charge-coupled device (CCD) or a complimentary metal-oxide semiconductor (CMOS).

At step 204, the obtained quad pixels can be transformed into YUV triples. For example, lossless transform (1) can be used to establish four triples (e.g., $y_i$, $u_i$, $v_i$) for each pixel in a quad.

At step 206, the processing mode for the quad can be determined. For example, it can be determined which of four processing modes a quad should use depending on simplex boundaries and exclusion in chroma subspace (assuming hard constants $TU_0$, $TU_1$, $TV_0$, $TV_1$ are predetermined):

```
if(max(u_i) − min(u_i) < TU_0 and max(v_i) − min(v_i) < TV_0)
  then qmode := 0,
else if(|u_1 − u_0|, |u_3 − u_2| < TU_1 and |v_1 − v_0|, |v_3 − v_2| < TV_1)
  then qmode := 1,
else if(|u_0 − u_2|, |u_1 − u_3| < TU_1 and |v_0 − v_2|, |v_1 − v_3| < TV_1)
  then qmode := 2,
else qmode := 3.
```

At step 208, mode bits representing the determined processing mode can be inserted into the compression stream. For example, two bits representing the qmode (e.g., mode 0, 1, 2, or 3) can be inserted into the compression stream. After the mode bits are inserted into the compression stream, 46 bits remain for encoding luminance/chroma information for a given pixel quad.

At step 210, image compression (e.g., pixel quad compression) can be performed based on the determined processing mode. For example, the pixel data for the quad can be compressed according to the qmode value for a quad.

At step 212, the compressed pixel quad data can be injected into the compression stream. For example, the bits of compressed pixel quad data can be injected into the compression stream according to the encoding scheme described in reference to FIG. 2B.

Figure 2B:
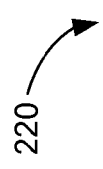
FIG. 2B illustrates an example of compression-stream bit allocations for "steady chroma" mode for Simplex compression.

FIG. 2B illustrates an example of compression-stream bit allocations for qmode=0 (also referred to as "steady chroma" mode). In some implementations, if qmode=0, 8-bit values $y_i$ can be inserted into the compression stream and chroma averages can be calculated according to $$u_{ave} := \left\lfloor \frac{\sum_i u_i + 2}{4} \right\rfloor, \tag{6}$$

$$v_{ave} := \left\lfloor \frac{\sum_i v_i + 2}{4} \right\rfloor. \tag{7}$$

The 7-bit chroma averages $U_0:=U(u_{ave}, 7)$; $V_0:=V(v_{ave}, 7)$ can be encoded and inserted into the compression stream. For example, referring to FIG. 2B, compressed pixel quad 220 can include pixels 222, 224, 226 and 228. Pixels 222, 224, 226 and 228 each have their respective luminance values $y_i$ encoded with 8 bits, resulting in 32 bits being included in the compression stream. However, only one pair of 7-bit averaged $U_0$ and $V_0$ values is inserted in the compression stream, resulting in quad 220 being encoded with a total of 46 bits.

Figure 2C:
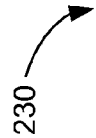
FIG. 2C illustrates compression-stream bit allocations for "horizontal bars" mode for Simplex-1 compression.

FIG. 2C illustrates compression-stream bit allocations for qmode=1 (also referred to as "horizontal bars" mode). According to some implementations, if qmode=1, four 7-bit quantized values $Y_i:=Y(y_i, 7)$ can be inserted into the compression stream along with four chroma values quantized as follows:

$$U_o := U\left(\left\lfloor \frac{U_0 + U_1 + 1}{2} \right\rfloor, 4\right), \tag{8}$$

$$V_o := V\left(\left\lfloor \frac{v_0 + v_1 + 1}{2} \right\rfloor, 5\right), \tag{9}$$

$$U_1 := U\left(\left\lfloor \frac{U_2 + U_3 + 1}{2} \right\rfloor, 4\right), \tag{10}$$

$$V_1 := V\left(\left\lfloor \frac{v_2 + v_3 + 1}{2} \right\rfloor, 5\right). \tag{11}$$

Referring to FIG. 2C, compressed quad 230 includes pixels 232, 234, 236 and 238. The bits for quad 230 are allocated such that the horizontally arranged pixel pairs (e.g., pixels 232, 234 and pixels 236, 238) share averaged U and V values. Luminance (y) is preserved for each pixel, horizontal arranged pixels 232, 234 share averaged $U_0$ and $V_0$ values and horizontally arranged pixels 236, 238 share averaged $U_1$ and $V_1$ values.

Figure 2D:
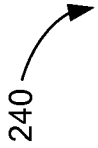
FIG. 2D illustrates an example of compression-stream bit allocations for "vertical bars" mode for Simplex compression.

FIG. 2D illustrates an example of compression-stream bit allocations for qmode=2 (i.e., "vertical bars" mode). According to some implementations, if qmode=2, then four 7-bit quantized luminance values $Y_i:=Y(y_i, 7)$ and four quantized chroma values can be inserted into the compression scheme, where quantized chroma values are given by $$U_o := U\left(\left\lfloor \frac{U_0 + U_2 + 1}{2} \right\rfloor, 4\right), \quad (12)$$

$$V_o := V\left(\left\lfloor \frac{v_0 + v_2 + 1}{2} \right\rfloor, 5\right), \quad (13)$$

$$U_1 := U\left(\left\lfloor \frac{U_1 + U_3 + 1}{2} \right\rfloor, 4\right), \quad (14)$$

$$V_1 := V\left(\left\lfloor \frac{v_1 + v_3 + 1}{2} \right\rfloor, 5\right). \quad (15)$$

Referring to FIG. 2D, compressed quad 240 includes pixels 242, 244, 246 and 248. The bits for quad 230 are allocated such that the vertically arranged pixels (e.g., pixels 242, 246 and pixels 244, 248) share averaged U and V values. Luminance (y) is preserved for each pixel, vertically arranged pixel pair 242, 246 share averaged $U_0$ and $V_0$ values and vertically arranged pixel pair 244, 248 share averaged $U_i$ and $V_i$ values.

Figure 2E:
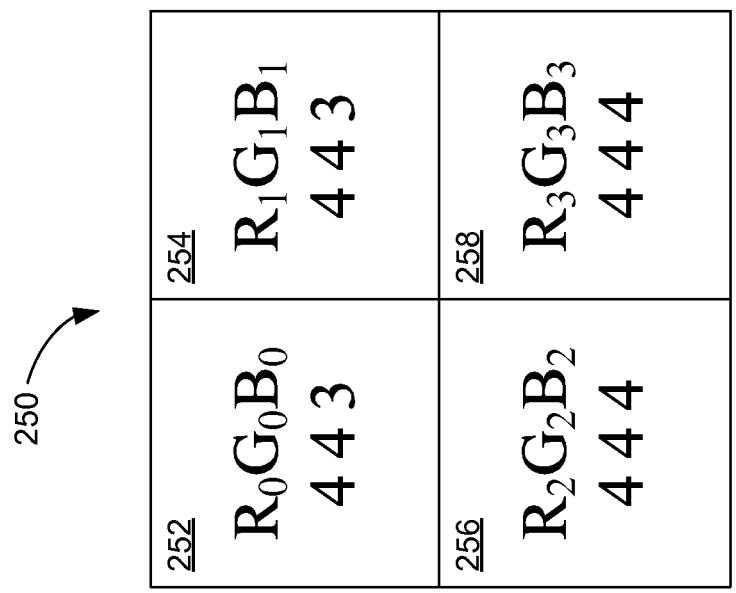
FIG. 2E illustrates an example of compression-stream bit allocations for "noise" mode.

FIG. 2E illustrates an example of compression-stream bit allocations for qmode=3 (also referred to as "noise" mode). According to implementations, if qmode=3, $r_i$, $g_i$ and $b_i$ components can be operated on directly. For example, the $r_i$, $g_i$, $b_i$ components can be quantized as $R_i:=R(r_i, b)$, $G_i:=G(g_i, b)$; $B_i:=B(b_i, b)$ for various b-bit counts. Referring to FIG. 2E, compressed quad 250 can include pixels 252, 254, 256 and 258.

In some implementations, r, g, b data can be recovered for a given quad according to the qmode, using dequantization functions based on the detailed bit allocations described above and inverse-clip transform (3) (where appropriate) to recover $r_1$, $g_i$, $b_i$.

Simplex compression can yield low RMSE in the region of 1.0-3.0 across a wide range of images. Simplex compression can be superior to the highest-quality Joint Pictures Experts Group (JPEG) compression processes. Monitor screens can employ the 2:1 memory reduction to generate a visually pleasing display of images with little or no loss of perceptual detail.

Simplex-61 Compression

In some implementations, Simplex-61 compression can compress a 96-bit pixel quad to 61 bits. In some implementations, Simplex-61 compression can have a reduced operation complexity as compared to the Simplex compression. For example, Simplex-61 compression can avoid using YUV transforms. Instead, Simplex-61 compression can employ the span of a quad for compression and encoding, as defined below.

Figure 3A:
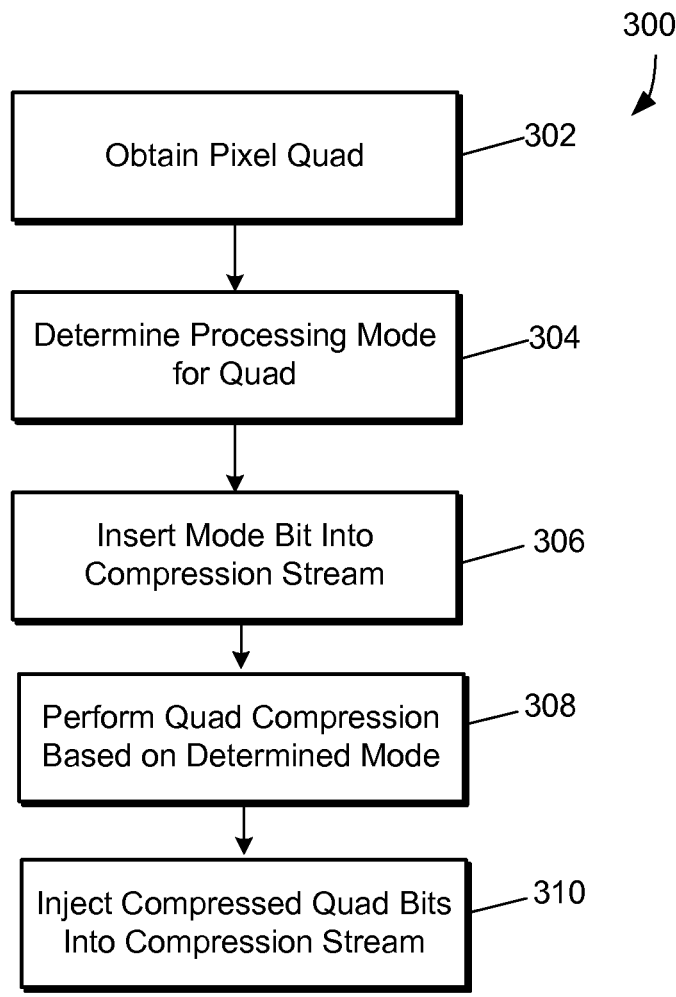
FIG. 3A is a flow diagram of an example process for performing Simplex-61 compression.

FIG. 3A is a flow diagram of an example process 300 for performing Simplex-61 compression. For example process 300, 96-bit rgb pixel quads are assumed and arithmetic can be performed directly in the RGB space. At step 302, a pixel quad can be obtained from an image sensor or other source. For each pixel in a quad, assume that the pixel colors are labeled $r_i$, $g_i$, $b_i$, for i=0, 1, 2 or 3.

At step 304, a processing mode for a pixel quad can be determined. In some implementations, one of two processing modes to be used by a given quad can be determined based on simplex boundaries and exclusion in RGB space. In some implementations, a hard constant TH can be predetermined and the processing modes can be determined using the definition:

span(a, b, c, d) := max(a, b, c, d) − min(a, b, c, d).
If (span($r_i$) < TH and span($g_i$) < TH and span($b_i$) < TH) qmode := 0, else qmode := 1.

At step 306, one bit (e.g., 0 or 1) can be inserted in the compression stream to represent qmode. Since Simplex-61 compression process 300 only has two processing modes, one bit is sufficient to represent one of the two processing modes in the compression stream. For a given pixel quad, this leaves 60 bits for color encoding.

At step 308, Simplex-61 compression can be performed based on the determined mode. For example, color encoding can be performed based on the qmode values as described below. At step 310, the compressed quad bits can be injected into the compression stream, as described further below.

Figure 3B:
FIG. 3B illustrates an example of compression-stream bit allocations for average plus difference mode for Simplex-61 compression.

FIG. 3B illustrates an example of compression-stream bit allocations for qmode=0 (e.g., average plus difference) for Simplex-61 compression. The color data for quad 320 includes rgb averages for the quad and rgb difference values for each pixel in the quad (e.g., pixels 322, 324, 326 and 328). For example, r, g, b averages for the quad can be inserted into the compression stream, along with requisite deviations for each pixel in the quad. The pixel differences can be represented by signed 3-bit nibbles. The combination of the quad rgb averages and the individual pixel differences can amount to 60 bits for the quad's colors. In some implementations, if qmode=0, color averages can be calculated as 8-bit entities and inserted into the compression stream as 8-bit color averages. For example, the 8-bit averages can be calculated according to the following:

$$r_{ave} := \left\lfloor \frac{\sum_i r_i}{4} \right\rfloor, \quad (16)$$

$$g_{ave} := \left\lfloor \frac{\sum_i g_i}{4} \right\rfloor, \quad (17)$$

$$b_{ave} := \left\lfloor \frac{\sum_i b_i}{4} \right\rfloor, \quad (18)$$

After calculating the 8-bit color averages, the twelve signed, 3-bit deviations can be encoded (for TH:=6). For example, the deviations $dr_i = r_{ave} - r_i$, $dg_i = g_{ave} - g_i$, and $db_i = b_{ave} - b_i$.

An example of encoding based on qmode is illustrated in FIG. 3B.

Figure 3C:
FIG. 3C illustrates an example of compression-stream bit allocations for "random colors" mode for Simplex-61 compression.

FIG. 3C illustrates an example of compression-stream bit allocations for qmode==1 (also referred to as "random colors" mode) for Simplex-61 compression. In some implementations, if qmode==1, 15-bit RGB triples can be inserted into the compression stream for all pixel data. For example, for quad 330, pixels 332, 334, 336 and 338 each have 5 bits allocated for each r, g, b, value. Thus, there can be 60 bits used for all coloring.

In some implementations, r, g, b, data can be recovered for a given quad according to qmode using dequantization functions based on the detailed bit allocations as described above.

Simplex-61 compression tends to yield RMSE that competes favorably with Simplex compression, because Simplex-61 compression involves more encoded bits per pixel-quad, while Simplex compression involves the psychovisually telling YUV space. For example, when the threshold TH is set to the value 6, the qmode=0 branch of the Simplex-61 compression process can be lossless. Thus, Simplex-61 compression can be thought of as lossless on digital images, yet forcing the same ratio 96:61 on "noise."

State-Machine Compression

In some implementations, a State-Machine compression process can be performed. For example, a state machine can be propagated along scan lines of pixels captured by an image sensor to perform local image compression at a pixel. In some implementations, the compression arithmetic cannot entirely be local because the compression process for a pixel can depend on the previous pixel, and that previous decoded pixel can depend on its previous pixel, and so on. However, the compression arithmetic can be performed in the current locale of a pixel.

Figure 4A:
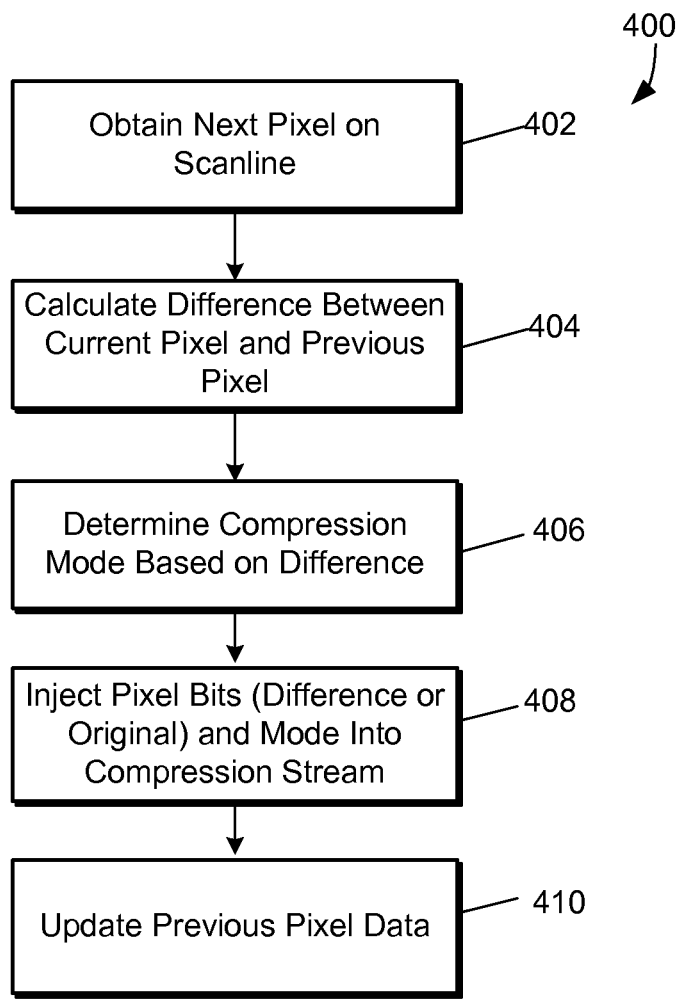
FIG. 4A is a flow diagram of a process for State-Machine compression.

FIG. 4A is a flow diagram of a process 400 for State-Machine compression. For example, State-Machine compression can be performed by calculating the compression for each pixel based on the decoded result of the previous pixel. For example, the compression process can use B bits per color channel (e.g., B=4 or 5). Thus, the compression stream can have 3B+1 bits per pixel.

At step 402, a pixel quad can be obtained. For example, the pixel quad can be obtained from an image sensor (e.g., CCD or CMOS). In some implementations, the State-Machine compression process can start with the assumption of a black pixel (e.g., $r_p g_p b_p=(0, 0, 0)$) to the left of the scan line and by denoting by rgb the true, 24-bit color of the next pixel.

At step 404, the difference between the true rgb values of the current pixel and the true rgb values of the previous pixel can be calculated. Alternatively, the difference between the true rgb values of the current pixel and the difference rgb values calculated for the previous pixel in a prior iteration can be calculated.

At step 406, a compression mode can be determined based on the pixel color differences calculated at step 404. In some implementations, if the vector $\delta(rgb):=rgb-r_p g_p b_p$ has all three components in $[-2(B-1); 2(B-1)-1]$, the qmode=0. In some implementations, if the calculated rgb difference (drgb) overflows the signed B-bits in any channel, the original true rgb can be encoded as three B-bit values.

At step 408, the pixel bit values and mode can be injected into the compression stream. In some implementations, the three signed B-bit values for $\delta(rgb)$ can be sent to the compression stream. For example, the size of the qmode and the B-bit values can be 3B+1 bits. In some implementations, the original true rgb values encoded as three B-bit values can be sent to the compression stream along with the value of the qmode (e.g., qmode=1). Again, this is 3B+1 bits.

At step 410, the previous pixel values can be updated. For example, $r_p g_p b_p$ can be updated to be the pixel colors the decoder will reconstruct based on mode instead of the original rgb. For example, it is here that the encoder can maintain synchrony with the decoder.

Figure 4B:
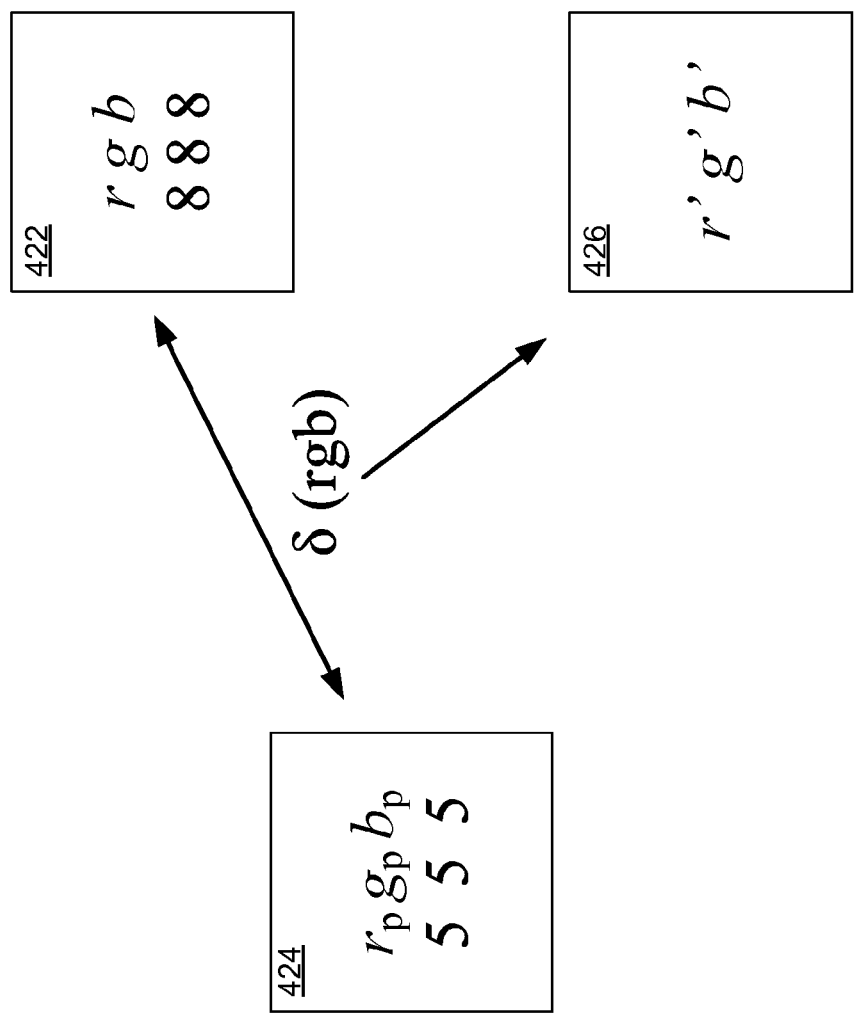
FIG. 4B illustrates an example of the State-Machine compression process.

FIG. 4B illustrates an example of State-Machine compression that uses either the pixel difference or a literal reconstruction to construct a new pixel based on its predecessor. In particular, FIG. 4B illustrates the State-Machine compression process for B=5. In some implementations, $r'g'b'=r_p g_p b_p+\delta$ (rgb)(555) or r'g'b'=rgb(555). For example, the difference between the rgb values for pixel 426 and predecessor pixel 424 can be determined and the difference can be stored as the compressed rgb value for compressed pixel 426. The rgb values for predecessor pixel 424 can include an rgb difference value previously calculated for pixel 424. In some implementations, the next pixel can be reconstructed based on the qmode bit using appropriate algebra.

The State-Machine compression process can operate as a lossy predictor-corrector. There can be a quad-pixel variant of this process, based on classical predictor-corrector schemes typically used in lossless mode. Updating $r_p g_p b_p$ to be the pixel colors the decoder will reconstruct based on mode can keep the encoder and decoder from drifting away from each other due to lossiness.

Percolating-Stack

It is possible to find rare, pathological images that look slightly improper with the above mode-switching compression processes (e.g., Simplex, Simplex-61, State-Machine). For example, if one "checkboards" a digital image by, for example, forcing each pixel of the image to be black if x+y is even, then many of the mode-switching compression processes described above can be thrown into "noise" mode on most every occurrence of a black checker. A stack-based compression process (also referred to as "Percolating-Stack" process) can be implemented to address pathological images. The Percolating-Stack process uses a stack of historically popular colors to address pathological images.

Figure 5A:
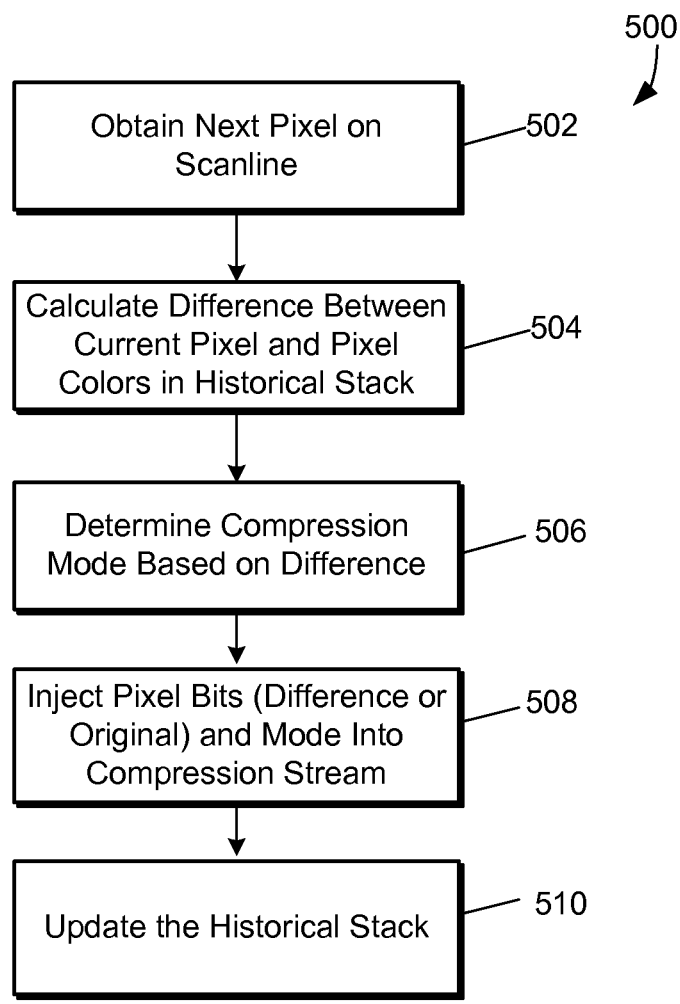
FIG. 5A is a flow diagram of a Percolating-Stack process.

FIG. 5A is a flow diagram of a process 500 for Percolating-Stack process. According to some implementations, each pixel can be calculated based on a decoded result of the pixels in a move-to-front stack having three historical colors. We choose B bits per color channel (e.g., B=4 or 5) and the compression stream can have 3B+2 bits per pixel.

At step 502, the next pixel on the scan line is obtained. In some implementations, a 3-pixel stack can be initialized to (0, 0, 0), (0, 0, 0), and (0, 0, 0) and the true, 24-bit color of the next pixel can be denoted by rgb.

At step 504, the difference between the current pixel and each of the pixel colors in the historical stack can be calculated. For example, the difference can be calculated by $\delta(rgb):=rgb-r_i g_i b_i$ where i runs over the stack indices 0, 1, 2.

At step 506, the compression mode can be determined based on the difference calculated at step 504. In some implementations, if one of the vectors $\delta(rgb):=rgb-r_i g_i b_i$ where i runs over the stack indices 0, 1, 2 has all three components in $[-2(B-1), 2(B-1)-1]$ then the qmode value is equal to the index (e.g., qmode=i). In some implementations, if the rgb difference (drgb) overflows signed B-bits in any channel, then the qmode value equals 3.

At step 508, the pixel color bits and the mode bits can be injected into the compression stream. For example, for qmode==i (e.g., qmode==0, 1, 2), the qmode value and three signed B-bit values for $\delta(rgb)$ can be sent to the compression stream. The size of the qmode value and the B-bit values can be 3B+2 bits. If qmode==3, the original true rgb can be encoded as three B-bit values and sent to the compression stream along with qmode=3. Again, this can be 3B+2 bits.

At step 510, the historical stack color values can be updated. In some implementations, the stack can be updated by moving-to-front (i.e. position i=0) the chosen stack color of index i, or write in front the pixel generated by qmode=3. In some implementations, the encoder can maintain synchrony with the decoder by percolating the color stack in the same way.

Figure 5B:
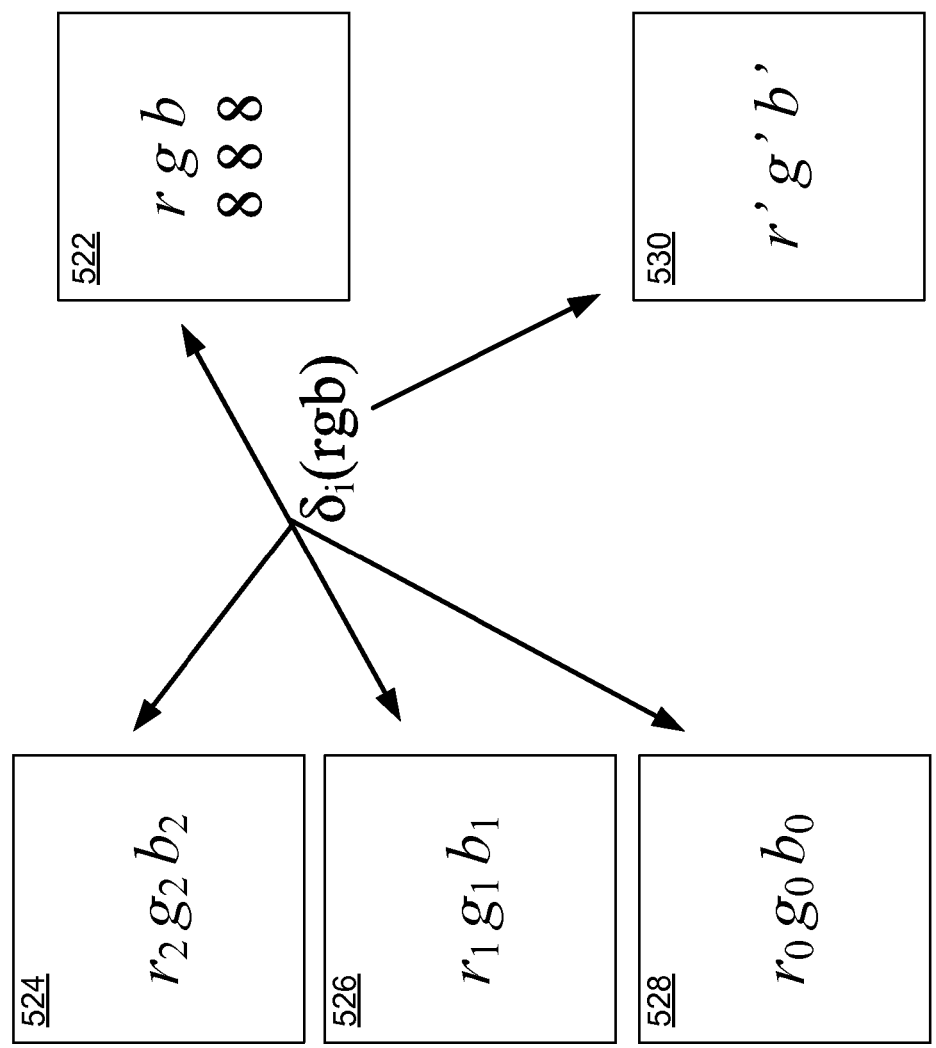
FIG. 5B illustrates an example of the Percolating-Stack process.

FIG. 5B illustrates an example of the Percolating-Stack compression process that uses either the pixel difference with a chosen pixel from a move-to-front stack, or a literal reconstruction to construct a new pixel based on its predecessor. In particular, FIG. 5B illustrates the Percolating-Stack process for B=5 and a fixed bot-count of 3·5+2=17 bits per pixel. In some implementations, $r'g'b=r_i g_i b_i + \delta_i(rgb)(555)$ or $r'g'b'=rgb$ (555). For example, the rgb values for current pixel 522 can be compared or differenced with historical stack color values for stack indexes 524, 526 and 528. If the difference between 522 and one of the indexes 524, 526 or 528 falls within the threshold described above, the difference can be stored as the compressed rgb value for compressed pixel 530. In some implementations, the next pixel can be reconstructed based on two qmode bits using the appropriate algebra.

Example Pseudo Code

According to implementations, the Simplex, Simplex-61, State-Machine and/or Percolating-Stack compression processes can be performed by functions similar to the following example pseudo code written in Mathematica™ code, which is a well-known mathematical computational software program used in scientific, engineering, and mathematical fields and other areas of technical computing. Mathematica™ is developed by Wolfram Research of Champaign, Ill. USA.

(* Pseudo code for Simplex.*)

(* Next, PVIC functions. *)
$YUV[rgb\_] := \text{Module}[\{yy\},$
    $yy = \text{Floor}[(2\ rgb[[1]] + 2\ rgb[[2]] + 2\ rgb[[3]] + 3\ )/6];$
    $\{yy, \text{Floor}[(rgb[[1]] - 2\ rgb[[2]] + rgb[[3]]\ )/2],$
    $rgb[[1]] - rgb[[3]]\}$
$];$ $RGB[yuv\_] := \text{Module}[\{y = yuv[[1]], u = yuv[[2]],$
    $v = yuv[[3]]\}, \{rr, gg, bb\} = \{y + \text{Floor}[(2\ u + 3\ v + 3)/6],$
    $y - \text{Floor}[(4\ u + 3)/6], y + \text{Floor}[(2\ u - 3\ v + 3\ )/6]\};$

```
        If [(Mod[u, 3] == 2) && (Mod[rr + gg + bb, 3] == 0), --gg];
        rr = Min[255, Max[0, rr]];
        gg = Min[255, Max[0, gg]];
        bb = Min[255, Max[0, bb]];
        {rr, gg, bb}
];

(* Next, quantization and dequantization functions. *)
encY[y_, b_] := Floor[y/2^(8 - b)];

decY[Y_, b_] := Module[{},
        If[b == 7, Return[Floor[(129*Y)/64]]];
        If[b == 6, Return[Floor[(65*Y)/16]]];
        If[b == 5, Return[Floor[(33*Y)/4]]];
        If[b == 4, Return[17 Y]];
        If[b == 3, Return[Floor[(73*Y)/2]]];
];

decH[h_, b_] := Module[{ }, h * 2^(8 - b) + 2^(7 - b)];

encC[u_, mn_, mx_, b_] := Module[{eu, sp, of, val},
        eu = Min[mx, Max[mn, u]];
        sp = mx - mn;
        of = eu - mn;
        If[sp < 2^b, Return[of]];
        Floor[(of * 2^b)/(sp + 1)]
];

decC[w_, mn_, mx_, b_] := Module[{sp, gu}, sp = mx - mn;
        If[sp < 2^b, Return[mn + w]];
        gu = mn + Floor[((sp + 1)*(2 w + 1) + 2^b)/(2^(b + 1))];
```

```
        If[Abs[gu] < 3, gu = 0];
        gu
];

(* Create hard chroma-limit tables. *)
w = 256;
cmaxU = Table[0, {w}]; cminU = cmaxU; cminV = cmaxU; cmaxV = cmaxU;

Do[
        {y, u, v} = YUV[{r, g, b}];
        If[cmaxV[[y+1]] < v, cmaxV[[y+1]] = v];
        If[cminV[[y+1]] > v, cminV[[y+1]] = v];
        If[cmaxU[[y+1]] < u, cmaxU[[y+1]] = u];
        If[cminU[[y+1]] > u, cminU[[y+1]] = u]
        ,{r,0,w-1}, {b,0,w-1}, {g,0,w-1}];

(* BEGIN PVIC Simplex-1 process (above PVIC functions/tables presumed ready). *)

(* The TU0, TV0, TU1 and TV1 parameters to be hard-tuned to minimize RMSE across a suitable test suite. *)
TU0 = 20;
TV0 = 30;
TU1 = 20;
TV1 = 30;
startRow = h - 1;
numQuads = Floor[h / 2];
endRow = startRow - (2 * (numQuads - 1));
ct0 = ct1 = ct2 = ct3 = 0;

(* We start by making reconstruction 'recon' a mere copy. *)
recon = source; (* 'source' is a pixel list, w*h triples, as in {{r, g, b}, {r, g, b},... *)
```

Print["Starting encode"];

Do[

(*Pick up the quad's luminance/chromas. *)
{y0, u0, v0} = YUV[rgb0 = source[[x + w*(y - 1)]]];
{y1, u1, v1} = YUV[rgb1 = source[[x + 1 + w*(y - 1)]]];
{y2, u2, v2} = YUV[rgb2 = source[[x + w*(y - 1 + 1)]]];
{y3, u3, v3} = YUV[rgb3 = source[[x + 1 + w*(y - 1 + 1)]]];

(*qmode is always a 2-bit number; there are 4 modes of quad processing. *)
qmode = -1;

If[ (Max[{u0, u1, u2, u3}] - Min[{u0, u1, u2, u3}] < TU0) &&
    (Max[{v0, v1, v2, v3}] - Min[{v0, v1, v2, v3}] < TV0),
        qmode = 0; ++ct0;
        {yenc0, yenc1, yenc2, yenc3} = {y0, y1, y2, y3};

uave = Floor[(u0 + u1 + u2 + u3 + 2)/4];
vave = Floor[(v0 + v1 + v2 + v3 + 2)/4];

mn = Min[{cminU[[y0 + 1]], cminU[[y1 + 1]], cminU[[y2 + 1]],
     cminU[[y3 + 1]]}];

mx = Max[{cmaxU[[y0 + 1]], cmaxU[[y1 + 1]], cmaxU[[y2 + 1]],
     cmaxU[[y3 + 1]]}];

uenc = encC[uave, mn, mx, 7];

mn = Min[{cminV[[y0 + 1]], cminV[[y1 + 1]], cminV[[y2 + 1]],
     cminV[[y3 + 1]]}];

```
        mx = Max[{cmaxV[[y0 + 1]], cmaxV[[y1 + 1]], cmaxV[[y2 + 1]],
            cmaxV[[y3 + 1]]}];

venc = encC[vave, mn, mx, 7];
];

If [(qmode < 0) && (Abs[u1 - u0] < TU1) && (Abs[u3 - u2] < TU1) &&
        (Abs[v1 - v0] < TV1) && (Abs[v3 - v2] < TV1),
    qmode = 1; ++ct1;

{yenc0, yenc1, yenc2, yenc3} = {encY[y0, 7], encY[y1, 7], encY[y2, 7],
        encY[y3, 7]};

{y0, y1, y2, y3} = {decY[yenc0, 7], decY[yenc1, 7], decY[yenc2, 7],
        decY[yenc3, 7]};

uave = Floor[(u0 + u1 + 1)/2];
    mn = Min[{cminU[[y0 + 1]], cminU[[y1 + 1]]}];
    mx = Max[{cmaxU[[y0 + 1]], cmaxU[[y1 + 1]]}];
    uenc0 = encC[uave, mn, mx, 4];
    vave = Floor[(v0 + v1 + 1)/2];
    mn = Min[{cminV[[y0 + 1]], cminV[[y1 + 1]]}];
    mx = Max[{cmaxV[[y0 + 1]], cmaxV[[y1 + 1]]}];
    venc0 = encC[vave, mn, mx, 5];
    uave = Floor[(u2 + u3 + 1)/2];
    mn = Min[{cminU[[y2 + 1]], cminU[[y3 + 1]]}];
    mx = Max[{cmaxU[[y2 + 1]], cmaxU[[y3 + 1]]}];
    uenc1 = encC[uave, mn, mx, 4];
    vave = Floor[(v2 + v3 + 1)/2];
    mn = Min[{cminV[[y2 + 1]], cminV[[y3 + 1]]}];
    mx = Max[{cmaxV[[y2 + 1]], cmaxV[[y3 + 1]]}];
```

```
            venc1 = encC[vave, mn, mx, 5];
];

If [(qmode < 0) && (Abs[u2 - u0] < TU1) && (Abs[u3 - u1] < TU1) &&
        (Abs[v2 - v0] < TV1) && (Abs[v3 - v1] < TV1), qmode = 2; ++ct2;
    {yenc0, yenc1, yenc2, yenc3} = {encY[y0, 7], encY[y1, 7], encY[y2, 7],
      encY[y3, 7]};

{y0, y1, y2, y3} = {decY[yenc0, 7], decY[yenc1, 7], decY[yenc2, 7],
      decY[yenc3, 7]};

uave = Floor[(u0 + u2 + 1)/2];
    mn = Min[{cminU[[y0 + 1]], cminU[[y2 + 1]]}];
    mx = Max[{cmaxU[[y0 + 1]], cmaxU[[y2 + 1]]}];
    uenc0 = encC[uave, mn, mx, 4];
    vave = Floor[(v0 + v2 + 1)/2];
    mn = Min[{cminV[[y0 + 1]], cminV[[y2 + 1]]}];
    mx = Max[{cmaxV[[y0 + 1]], cmaxV[[y2 + 1]]}];
    venc0 = encC[vave, mn, mx, 5];
    uave = Floor[(u1 + u3 + 1)/2];
    mn = Min[{cminU[[y1 + 1]], cminU[[y3 + 1]]}];
    mx = Max[{cmaxU[[y1 + 1]], cmaxU[[y3 + 1]]}];
    uenc1 = encC[uave, mn, mx, 4];
    vave = Floor[(v1 + v3 + 1)/2];
    mn = Min[{cminV[[y1 + 1]], cminV[[y3 + 1]]}];
    mx = Max[{cmaxV[[y1 + 1]], cmaxV[[y3 + 1]]}];
    venc1 = encC[vave, mn, mx, 5];
];
```

If [*qmode* < 0,

*qmode* = 3; ++ct3;

br = bg = 4; bb = 4;

*rgb*enc2 = {encY[*rgb*2[[1]], br], encY[*rgb*2[[2]], bg], encY[*rgb*2[[3]], bb]};

*rgb*enc3 = {encY[*rgb*3[[1]], br], encY[*rgb*3[[2]], bg], encY[*rgb*3[[3]], bb]};

bb = 3;

*rgb*enc0 = {encY[*rgb*0[[1]], br], encY[*rgb*0[[2]], bg], encY[*rgb*0[[3]], bb]};

*rgb*enc1 = {encY[*rgb*1[[1]], br], encY[*rgb*1[[2]], bg], encY[*rgb*1[[3]], bb]};

];

(* The above sends always a 48-bit (max.) word to the stream.
This word is constructed like so:

| qmode | y-bits | u-bits | v-bits | r-bits | g-bits | b-bits |
|---|---|---|---|---|---|---|
| 00 | 8888 | 7 | 7 | N/A | N/A | N/A |
| 01 | 7777 | 44 | 55 | N/A | N/A | N/A |
| 10 | 7777 | 44 | 55 | N/A | N/A | N/A |
| 11 | N/A | N/A | N/A | 4444 | 4444 | 3344 |

*qmode* = 0: This is chroma-average mode, all 4 u's = uenc, all 4 v's = venc.

*qmode* = 1: This is horizontal-bar mode, so u0 = u1 = uenc0; u2 = u3 = uenc1, and sim. for v's.

*qmode* = 2: This is vertical bar mode, so u0 = u2, u1 = u3 and so on for v's.

*qmode* = 3; This is "noise" mode, reverting to quantized *r, g, b* separately for each pixel.
*)

(* Next, decode phase, switching on '*qmode*'. *)

If [*qmode* == 0,

{y0, y1, y2, y3} = {yenc0, yenc1, yenc2, yenc3};

mn = Min[{cminU[[y0 + 1]], cminU[[y1 + 1]], cminU[[y2 + 1]], cminU[[y3 + 1]]}];

```
mx = Max[{cmaxU[[y0 + 1]], cmaxU[[y1 + 1]], cmaxU[[y2 + 1]],
    cmaxU[[y3 + 1]]}];
uave = decC[uenc, mn, mx, 7];
mn = Min[{cminV[[y0 + 1]], cminV[[y1 + 1]], cminV[[y2 + 1]],
    cminV[[y3 + 1]]}];
mx = Max[{cmaxV[[y0 + 1]], cmaxV[[y1 + 1]], cmaxV[[y2 + 1]],
    cmaxV[[y3 + 1]]}];
vave = decC[venc, mn, mx, 7];
u0 = u1 = u2 = u3 = uave;
v0 = v1 = v2 = v3 = vave;
];

If [qmode == 1,
    {y0, y1, y2, y3} = {decY[yenc0, 7], decY[yenc1, 7],
        decY[yenc2, 7], decY[yenc3, 7]};
    mn = Min[{cminU[[y0 + 1]], cminU[[y1 + 1]]}];
    mx = Max[{cmaxU[[y0 + 1]], cmaxU[[y1 + 1]]}];
    u0 = u1 = decC[uenc0, mn, mx, 4];
    mn = Min[{cminU[[y2 + 1]], cminU[[y3 + 1]]}];
    mx = Max[{cmaxU[[y2 + 1]], cmaxU[[y3 + 1]]}];
    u2 = u3 = decC[uenc1, mn, mx, 4];
    mn = Min[{cminV[[y0 + 1]], cminV[[y1 + 1]]}];
    mx = Max[{cmaxV[[y0 + 1]], cmaxV[[y1 + 1]]}];
    v0 = v1 = decC[venc0, mn, mx, 5];
    mn = Min[{cminV[[y2 + 1]], cminV[[y3 + 1]]}];
    mx = Max[{cmaxV[[y2 + 1]], cmaxV[[y3 + 1]]}];
    v2 = v3 = decC[venc1, mn, mx, 5];
];

If [qmode == 2,
    {y0, y1, y2, y3} = {decY[yenc0, 7], decY[yenc1, 7],
```

```
            decY[yenc2, 7], decY[yenc3, 7]};
        mn = Min[{cminU[[y0 + 1]], cminU[[y2 + 1]]}];
        mx = Max[{cmaxU[[y0 + 1]], cmaxU[[y2 + 1]]}];
        u0 = u2 = decC[uenc0, mn, mx, 4];
        mn = Min[{cminU[[y1 + 1]], cminU[[y3 + 1]]}];
        mx = Max[{cmaxU[[y1 + 1]], cmaxU[[y3 + 1]]}];
        u1 = u3 = decC[uenc1, mn, mx, 4];
        mn = Min[{cminV[[y0 + 1]], cminV[[y2 + 1]]}];
        mx = Max[{cmaxV[[y0 + 1]], cmaxV[[y2 + 1]]}];
        v0 = v2 = decC[venc0, mn, mx, 5];
        mn = Min[{cminV[[y1 + 1]], cminV[[y3 + 1]]}];
        mx = Max[{cmaxV[[y1 + 1]], cmaxV[[y3 + 1]]}];
        v1 = v3 = decC[venc1, mn, mx, 5];
];

If [qmode < 3,
        recon[[x + w*(y - 1)]] = RGB[{y0, u0, v0}];
        recon[[x + 1 + w*(y - 1)]] = RGB[{y1, u1, v1}];
        recon[[x + w*(y - 1 + 1)]] = RGB[{y2, u2, v2}];
        recon[[x + 1 + w*(y - 1 + 1)]] = RGB[{y3, u3, v3}],
            br = bg = 4; bb = 4;
        recon[[x + w*(y - 1 + 1)]] = {decH[rgbenc2[[1]], br],
            decH[rgbenc2[[2]], bg], decH[rgbenc2[[3]], bb]};
        recon[[x + 1 + w*(y - 1 + 1)]] = {decH[rgbenc3[[1]], br],
            decH[rgbenc3[[2]], bg], decH[rgbenc3[[3]], bb]};
        bb = 3;
        recon[[x + w*(y - 1)]] = {decH[rgbenc0[[1]], br], decH[rgbenc0[[2]], bg],
            decH[rgbenc0[[3]], bb]};
        recon[[x + 1 + w*(y - 1)]] = {decH[rgbenc1[[1]], br],
            decH[rgbenc1[[2]], bg], decH[rgbenc1[[3]], bb]};
    ],
```

```
            {x, 1, w - 1, 2}, {y, startRow, endRow, -2}
];
```
==================================================
(* BEGIN PVIC Simplex-61 process. *)

TH = 6; (* Smoothness/averaging threshold. *)
encY[h_] := Floor[h/8]; (* Simplified quantization function. *)
decH[h_] := 8h + 4; (* Simplified dequantization function. *)
startRow = h - 1;
numQuads = Floor[h / 2];
endRow = startRow - (2 * (numQuads - 1));

Do[
```
            {r0, g0, b0} = source[[x + w*(y - 1)]];
            {r1, g1, b1} = source[[x + 1 + w*(y - 1)]];
            {r2, g2, b2} = source[[x + w*(y - 1 + 1)]];
            {r3, g3, b3} = source[[x + 1 + w*(y - 1 + 1)]];
            If [(Max[r0, r1, r2, r3] - Min[r0, r1, r2, r3] < TH) &&
                (Max[g0, g1, g2, g3] - Min[{g0, g1, g2, g3}] < TH) &&
                (Max[b0, b1, b2, b3] - Min[{b0, b1, b2, b3}] < TH),
                    qmode = 0;
                    rave = Floor[(r0 + r1 + r2 + r3)/4]; (* Unsigned 8-bit number. *)
                    gave = Floor[(g0 + g1 + g2 + g3)/4]; (* Unsigned 8-bit number. *)
                    bave = Floor[(b0 + b1 + b2 + b3)/4]; (* Unsigned 8-bit number. *)

dr = rave - {r0, r1, r2, r3} ;
                    (* Guaranteed to be four signed 3-bit numbers. *)

dg = gave - {g0, g1, g2, g3} ;
                    (* Guaranteed to be four signed 3-bit numbers. *)
```

```
db = bave - {b0, b1, b2, b3};
(* Guaranteed to be four signed 3-bit numbers. *)
(* At this point we insert into stream:
        8 8 8 for rave, gave, bave
        333 333 333 333 for the dr, dg, db components
        This is 60 bits, + 1 bit for qmode = 0.*)
, qmode = 1;

{renc0, genc0, benc0} = {encY[r0], encY[g0], encY[b0]};
(* Guaranteed to be three 5-bit unsigned. *)

{renc1, genc1, benc1} = {encY[r1], encY[g1], encY[b1]};
(* Guaranteed to be three 5-bit unsigned. *)

{renc2, genc2, benc2} = {encY[r2], encY[g2], encY[b2]};
(* Guaranteed to be three 5-bit unsigned. *)

{renc3, genc3, benc3} = {encY[r3], encY[g3], encY[b3]};
(* Guaranteed to be three 5-bit unsigned. *)

(* At this point we insert into stream:
        555 555 555 555 for the r, g, b components.
        This is 60 bits, + 1 bit for qmode = 1.*)
];

(* Next, decode phase, switching on 'qmode'. *)
If [qmode == 0,
    recon[[x + w*(y - 1)]] = {rave , gave , bave} - {dr[[1]], dg[[1]], db[[1]]};
    recon[[x + 1 + w*(y - 1)]] = {rave , gave , bave} - {dr[[2]], dg[[2]],
```

```
                                    db[[2]]};
        recon[[ x + w*(y - 1 + 1)]] = {rave , gave , bave} - {dr[[3]], dg[[3]],
                                    db[[3]]};
        recon[[x + 1 + w*(y - 1 + 1)]] = {rave , gave , bave} - {dr[[4]], dg[[4]],
                                    db[[4]]};
        ,
        recon[[x + w*(y - 1)]] = {decH[renc0], decH[genc0], decH[benc0]};
        recon[[x + 1 + w*(y - 1)]] = {decH[renc1], decH[genc1], decH[benc1]};
        recon[[x + w*(y - 1 + 1)]] = {decH[renc2], decH[genc2], decH[benc2]};
        recon[[x + 1 + w*(y - 1 + 1)]] = {decH[renc3], decH[genc3],
                                    decH[benc3]};
    ],
    {x, 1, w - 1, 2}, {y, startRow, endRow, -2}
];
==================================================
(* BEGIN PVIC State-Machine process. *)

(* First, two equivalent forms of simplex test. *)
inSimplex := (BitOr[BitAnd[drgb[[1]], -32], BitAnd[drgb[[2]], -32], BitAnd[drgb[[3]], -
            32]] == 0);

inSimplex := (drgb[[1]] >= 0 && drgb[[1]] < 32 && drgb[[2]] >= 0 &&
            drgb[[2]] < 32 && drgb[[3]] >= 0 && drgb[[3]] < 32) ;
ptr = 1;

Do[
        rgb = rgbq = {0, 0, 0}; mode = 0;
        (* Initialize row with phantom black pixel;
        note rgbq belongs to the decoding stage. *)

Do[
```

If[mode == 0, *rgb*p = *rgb*, *rgb*p = 8\**rgb*enc + 4];

*rgb* = source[[ptr]]; (* Pick up the pixel *rgb*. *)

*drgb* = *rgb* - *rgb*p + 16; (* Diff with the past pixel. *)

If[inSimplex, (* Simplex test. *)

mode = 0, (* Send mode as 1 bit, and *drgb* as 555 bits all 3

Unsigned. *)

*rgb*enc = Floor[*rgb*/8];

mode = 1; (* Send mode as 1 bit, and *rgb*enc as 555 bits all 3

Unsigned. *)

]; (* Next, decode logic. *)

recon[[ptr++]] = *rgb*q = If[mode == 0, *rgb*q + *drgb* - 16 , 8\**rgb*enc + 4], {x, 1, w}], {y, 1, h}

];
=======================================================
(* Begin PVIC Percolating-Stack process. *)

recon = source;

ct0 = ct1 = ct2 = ct3 = 0;

B = 4; (* Bits can be 4, 5, 6. The algorithm is "Stack2BBB" having 3B+2 bits/pixel. *)

PRE = 2^(8 - B); PRE2 = PRE/2;

LIM = 2^(B - 1);

coSimplex := ((*drgb*[[1]] >= -LIM) && (*drgb*[[1]] < LIM) && (*drgb*[[2]] >= -LIM) &&

(*drgb*[[2]] < LIM) && (*drgb*[[3]] >= -LIM) && (*drgb*[[3]] < LIM)) ;

ptr = 1;

Do[ dstack = estack = {source[[1 + w\*(y - 1)]], source[[2 + w\*(y - 1)]], source[[3 + w\*(y - 1)]]};

```
Do[
    rgb = source[[ptr]]; (* Pick up the pixel rgb. *)
    While[True, drgb = rgb - estack[[1]];
        If[coSimplex,(* Simplex test. *)
            mode = 0; ++ct0; (*Send mode as 2 bits, and drgb as BBB
                                bits. *)
            estack = {rgb, estack[[2]], estack[[3]]};
            Break[]
        ];

drgb = rgb - estack[[2]];
        If[coSimplex,(* Simplex test. *)
            mode = 1; ++ct1; (*Send mode as 2 bits, and drgb as BBB
                                bits. *)
            estack = {rgb, estack[[1]], estack[[3]]};
            Break[]
        ];

drgb = rgb - estack[[3]];
        If[coSimplex,(* Simplex test. *)
            mode = 2; ++ct2; (*Send mode as 2 bits, and drgb as BBB
                                bits. *)
            estack = {rgb, estack[[1]], estack[[2]]};
            Break[]
        ];

mode = 3; ++ct3;
        rgbenc = Floor[rgb/PRE];
        estack = {PRE*rgbenc + PRE2, estack[[1]], estack[[2]]};
        Break[]
]; (* Next, decode logic. *)
```

```
If[mode < 3,
    rgbq = dstack[[mode + 1]] + drgb;
    If[mode == 1, dstack[[2]] = dstack[[1]]];
    If[mode == 2, dstack[[3]] = dstack[[2]];
    dstack[[2]] = dstack[[1]]];
    ,
    rgbq = PRE*rgbcnc + PRE2;
    dstack[[3]] = dstack[[2]]; dstack[[2]] = dstack[[1]];
];

rcon[[ptr++]] = dstack[[1]] = rgbq,
{x, 1, w}],
{y, 1, h}];
```

Example Processing Pipeline

Figure 6A:
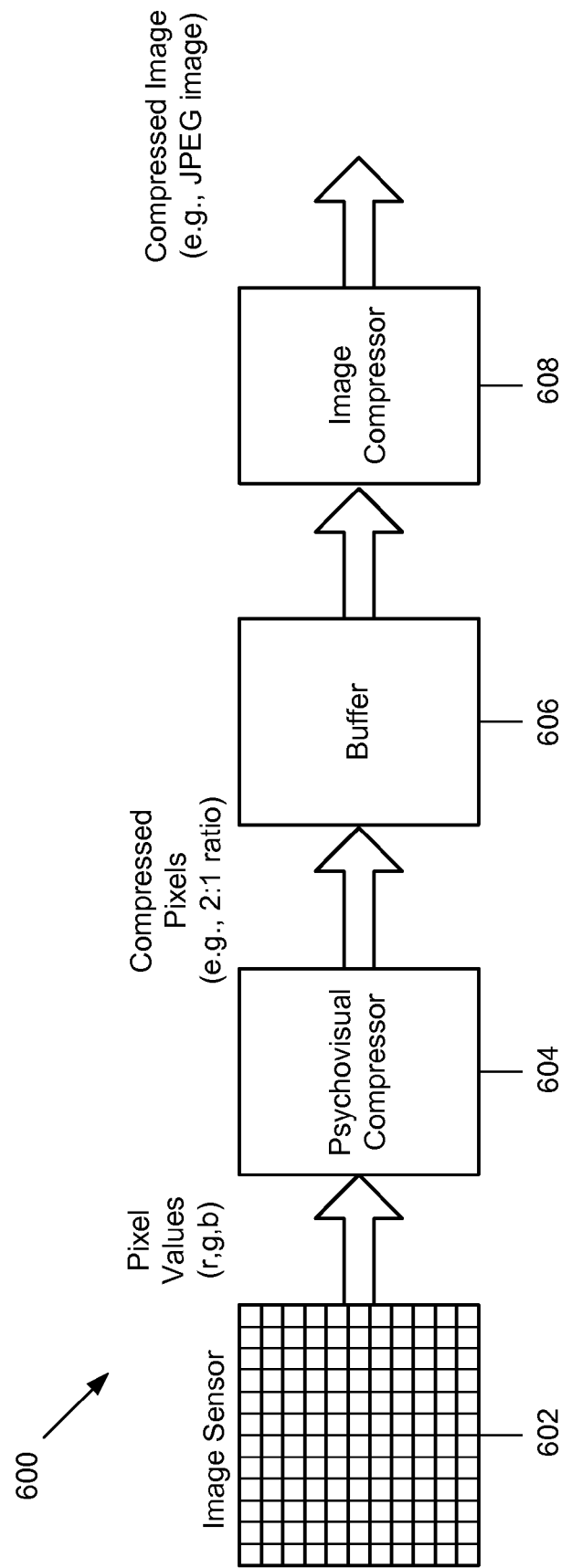
FIG. 6A is a block diagram of an exemplary processing pipeline, including a psychovisual compressor.

FIG. 6A is a block diagram of an exemplary processing pipeline 600 including a psychovisual compressor. In some implementations, processing pipeline 600 can include image sensor 602, psychovisual compressor 604, optional buffer 606 and image compressor 608.

Image sensor 602 (e.g., CCD, CMOS) can include an image array coupled to electronics for collecting electrical charge from the image array and converting the electrical charge into one or more digital values. In some implementations, digital values representing r, g, b, in RGB color space can be provided by the electronics.

Image sensor 602 is coupled to psychovisual compressor 604, which performs the various compression processes described in reference to FIGS. 1-5B. Processing pipeline 600 can be implemented in one or more integrated circuit (IC) chips or chip sets.

Psychovisual compressor 604 can be optionally coupled to buffer 606 for storing compressed pixel data of an image captured by image sensor 602. Optional image compressor 608 can perform one or more other image compression processes on some or all of the contents of buffer 606. For example, image compressor 608 can compress the contents of buffer 606 using a JPEG process or other known lossy or lossless image compression process (e.g., TIFF, GIFF, PNG) to further compress the image data. In some implementations, processing pipeline 600 can be a video processing pipeline for processing streaming video where psychovisual compression can be performed on some or all the frames of a video frame sequence.

Figure 6B:
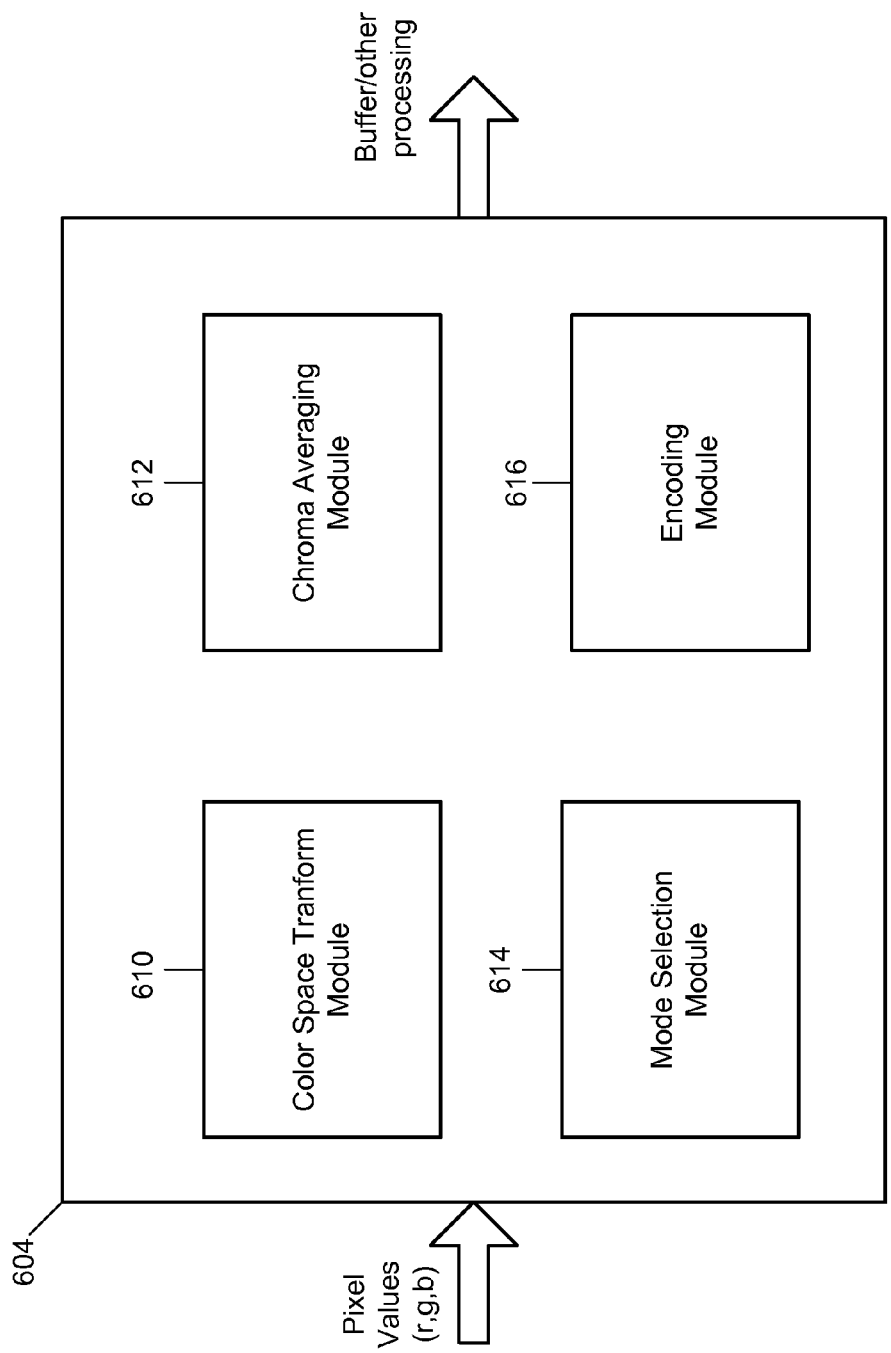
FIG. 6B is a block diagram of the psychovisual compressor shown in FIG. 6A.

FIG. 6B is a block diagram of the exemplary psychovisual compressor 604 shown in FIG. 6A. In some implementations, psychovisual compressor 604 can include color space transform module 610, chroma averaging module 612, mode selection module 614 and encoding module 616.

Color space transform module 610 is configured to transform pixel values from a first color space to a second color space, such as transforming pixel values from rgb color space into yuv color space. In some implementations, colors space transform 610 can be omitted or its functionality moved to a different part of processing pipeline 600.

Chroma averaging module 612 can perform the chroma averaging described in reference to FIGS. 1-5B.

Mode selection module 614 can determine a processing mode for a given pixel pair or quad depending on, for example, simplex boundaries and exclusion in chroma subspace, as described in reference to FIGS. 1-5B.

Encoding module 616 inserts the appropriate number of bits into the compression stream based on the processing mode to ensure a fixed compression ratio, as described in reference to FIGS. 1-5B.

Each of the modules 610, 612, 614, 616 can be implemented in hardware, software, firmware or a combination of hardware, software and firmware. In some implementations, psychovisual compressor 604 can be integrated with image sensor hardware.

Example System Architecture

Figure 7:
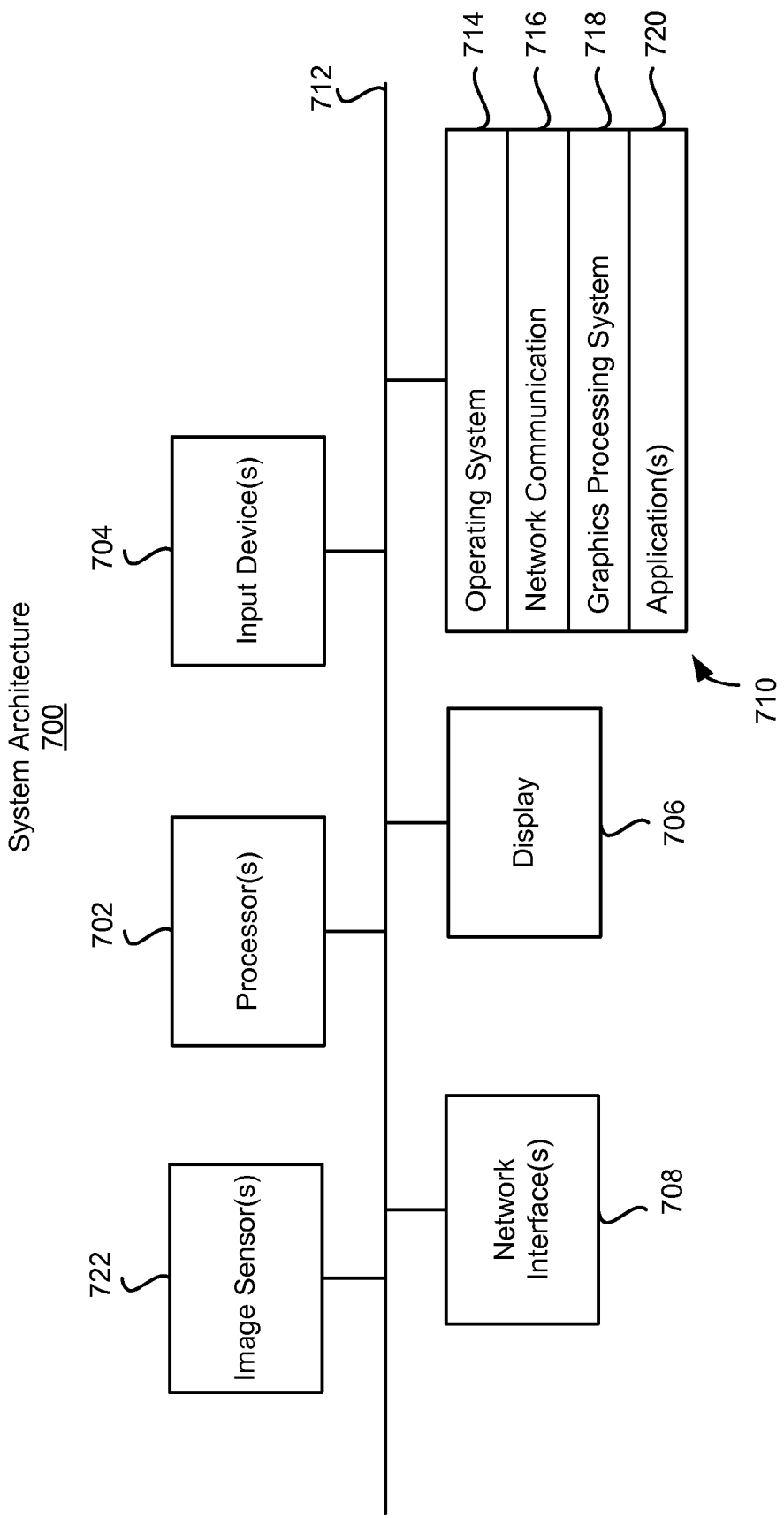
FIG. 7 is a block diagram of an exemplary system architecture implementing the features and processes of FIGS. 1-5B.

FIG. 7 is a block diagram of exemplary system architecture 700 implementing the features and processes of FIGS. 1-6B. The architecture 700 can be implemented on any electronic device that runs software applications derived from compiled instructions, including without limitation personal computers, servers, smart phones, media players, electronic tablets, game consoles, email devices, etc. In some implementations, the architecture 700 can include one or more processors 702, one or more input devices 704, one or more display devices 706, one or more network interfaces 708 and one or more computer-readable mediums 710. Each of these components can be coupled by bus 712.

Display device 706 can be any known display technology, including but not limited to display devices using Liquid Crystal Display (LCD) or Light Emitting Diode (LED) technology. Processor(s) 702 can use any known processor technology, including but are not limited to graphics processors and multi-core processors. Input device 704 can be any known input device technology, including but not limited to a keyboard (including a virtual keyboard), mouse, track ball, and touch-sensitive pad or display. Bus 712 can be any known internal or external bus technology, including but not limited to ISA, EISA, PCI, PCI Express, NuBus, USB, Serial ATA or FireWire. Computer-readable medium 710 can be any medium that participates in providing instructions to processor(s) 702 for execution, including without limitation, non-volatile storage media (e.g., optical disks, magnetic disks, flash drives, etc.) or volatile media (e.g., SDRAM, ROM, etc.).

Computer-readable medium 710 can include various instructions 714 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 can establish and maintain network connections (e.g., software for implementing communication protocols, such as TCP/IP, HTTP, Ethernet, etc.).

A graphics processing system 718 can include instructions that provide graphics and image processing capabilities. For example, the graphics processing system 718 can implement the image compression processes described with reference to FIGS. 1-5B.

Application(s) 720 can be an application that uses or implements the image compression processes described in reference to FIGS. 1-5B. The processes can also be implemented in operating system 714.

Image sensor(s) 722 can be any device (e.g., a charge-coupled device (CCD), a complimentary metal-oxide semiconductor (CMOS), etc.) that captures images that can be compressed using the image compression processes described with reference to FIGS. 1-5B. For example, one or more of the image compression processes can be performed as images are captured by the image sensor(s) 722 to compress the amount of data generated by the sensors and reduce the amount of data that is transmitted through the system 700. Image pixel data or pixel quad data that is collected by the image sensors 722 can be compressed according to the processes of FIGS. 1-5B as the pixel data or quad data is collected from or by the image sensor(s) 722.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can include or communicate with one or more mass storage devices for storing data files. Such devices can include magnetic disks, such as internal hard disks and removable disks; magneto-optical disks; and optical disks. Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user the features can be implemented on a computer having a display device such as a CRT (cathode ray tube) or LCD (liquid crystal display) monitor for displaying information to the user. A keyboard and a pointing device, such as a mouse or a trackball, can allow the user to provide input to the computer.

The features can be implemented in a computer system that includes a back-end component, such as a data server, or includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks, include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications can be made. For example, other steps can be provided, or steps can be eliminated, from the described flows, and other components can be added to, or removed from, the described systems. Accordingly, other implementations are within the scope of the following claims.

What is claimed is:

1. A method comprising:
   obtaining pixel data having a first data size;
   determining a processing mode from a number of available processing modes based on characteristics of the pixel data and one or more simplex boundaries and exclusion in a color subspace;
   selecting a psychovisual compression process based on the determined processing mode; and
   psychovisually compressing the pixel data to a second data size using the selected psychovisual compression process, where the second data size is less than the first data size and the first data size and the second data size have a fixed ratio,
   where the method is performed by at least one hardware apparatus.

2. The method of claim 1, further comprising:
   applying a lossless transform to the pixel data prior to compressing the pixel data.

3. The method of claim 1, wherein the pixel data includes a plurality of pixel quads and compressing the pixel data comprises iteratively compressing each of the plurality of pixel quads.

4. The method of claim 3, wherein at least two of the plurality of pixel quads are compressed using different processing modes.

5. The method of claim 1, wherein psychovisually compressing the pixel data comprises removing psychovisually unnecessary bits from the pixel data.

6. The method of claim 1, where psychovisually compressing the pixel data further comprises:
   based on the determined processing mode, calculating average chroma values from the pixel data;
   encoding the average chroma values with a first set of bits;
   encoding luminance values from the pixel data with a second set of bits; and
   inserting the first set of bits and the second set of bits into a compression stream.

7. The method of claim 6, further comprising:
   inserting data in the compression stream that indicates the processing mode used to encode the pixel data.

8. An image processing apparatus, comprising:
   an image sensor configured to capture pixel data; and
   one or more processors coupled to the image sensor and configured to:
      determine a processing mode from a number of available processing modes based on characteristics of the pixel data and one or more simplex boundaries and exclusion in a color subspace;
      select a psychovisual compression process based on the determined processing mode; and
      psychovisually compress the pixel data from a first data size to a second data size using the selected psychovisual compression process, where the second data size is less than the first data size and the first data size and the second data size have a fixed ratio.

9. The apparatus of claim 8, further comprising:
applying a lossless transform to the pixel data prior to compressing the pixel data.

10. The apparatus of claim 8, wherein the pixel data includes a plurality of pixel quads and compressing the pixel data comprises iteratively compressing each of the plurality of pixel quads.

11. The apparatus of claim 10, wherein at least two of the plurality of pixel quads are compressed using different processing modes.

12. The apparatus of claim 8, wherein psychovisually compressing the pixel data comprises removing psychovisually unnecessary bits from the pixel data.

13. The apparatus of claim 8, where psychovisually compressing the pixel data further comprises:
based on the determined processing mode, calculating average chroma values from the pixel data; and
encoding the average chroma values with a first set of bits;
encoding luminance values from the pixel data with a second set of bits; and
inserting the first set of bits and the second set of bits into a compression stream.

14. The apparatus of claim 13 further comprising:
inserting data in the compression stream that indicates the processing mode used to encode the pixel data.

* * * * *